UNITED STATES PATENT OFFICE 2,390,335

METHOD OF PREPARING HYDROXY DERIVATIVES OF ALIPHATIC ACIDS AND NEW COMPOUNDS PRODUCED THEREBY

Harry H. Sobotka and Martin I. Rubin, New York, N. Y., assignors to Mount Sinai Hospital Research Foundation, Inc., a membership corporation of New York No Drawing. Application August 4, 1941, Serial No. 405,408

10 Claims. (Cl. 260—486)

The present invention relates to a method of preparing hydroxy derivatives of α-β unsaturated aliphatic acids and to certain new compounds produced thereby having utility in the synthesis of various intermediates which have importance in the synthesis of therapeutic compounds, e. g., vitamin A and various other carotenoids.

The invention is based on our discovery that when an α-β unsaturated aliphatic acid, or its ester or similar derivative, is treated with selenous acid, $H_2SeO_3$, or selenium dioxide, $SeO_2$, under appropriate conditions as illustrated hereinafter, a β methyl group forming the end of the aliphatic chain is oxidized to the group, —$CH_2OH$. The resulting γ hydroxy acid may be obtained as such or as its acyl (e. g., acetyl) derivative or as a lactone. This method is of particular importance in preparing hydroxy derivatives of the normal and branched-chain unsaturated acids, such as crotonic acid and β-methylcrotonic acid (dimethyl acrylic acid). The oxidation may be performed without any solvent or in the presence of a solvent such as ethyl alcohol, dioxane or acetic anhydride. When the last-named compound is used an acetoxy derivative is formed from which the corresponding hydroxy derivative is obtained by alcoholysis by means of sulfuric acid in ethyl alcohol or by use of sodium methylate.

Example I

Crotonic acid ethyl ester (ethyl crotonate) was dissolved in 5 parts of dioxane and refluxed for 2 hours with ⅔ of its weight of selenous acid with stirring. After complete disappearance of white selenous acid, the solid selenium was filtered off and the solvent was removed under reduced pressure from the reaction mixture. The precipitated residue was then dissolved in ether and dried. The ether and unreacted starting material was removed by distillation and the lactone of γ-hydroxy crotonic acid was obtained by distillation in vacuo, boiling at 85 to 88° C. at 9 mm. pressure. This compound has the structural formula

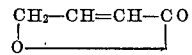

Example II 50 grams of the ethyl ester of dimethyl acrylic acid was dissolved in 200 cc. of acetic anhydride. This solution was heated to boiling, and during continuous stirring 25 grams of selenous dioxide were added over a period of one hour. After the addition, the solution was refluxed for an additional 2 hours. The precipitated selenium was filtered from the cooled solution and the filtrate was thrown into 3¼ times its own volume of water. A reddish oil precipitated and was separated from the aqueous layer. The resulting oil precipitate amounting to 40 grams was shaken with 18 grams of sodium carbonate dissolved in 120 cc. of water. The product, now the top layer, was separated from the aqueous portion. The aqueous layer was extracted once with ether and the ether extract combined with the main fraction. The combined extracts were washed with water, dried, freed from ether, and the residue was rectified twice under reduced pressure. The fraction boiling between 88 and 90° C. under 3–5 mm. pressure consisted of the γ-acetoxy-β-methyl crotonic acid ethyl ester, refractive index $N_D^{22}$ = 1.4524. This compound has the formula

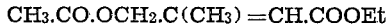

The acetyl group was subsequently removed by alcoholysis with sulfuric acid, and the resulting γ-hydroxy-β-methyl crotonic acid ethyl ester was obtained as a colorless liquid of boiling point 92–94° C. under a pressure of 3–4 mm. of mercury, having a refractive index $N_D^{24}$ = 1.4670 and a formula of

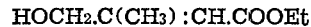

This substance was further characterized by its 3′,5′-dinitrobenzoyl-derivative of melting point 91° C.

Example III 50 grams of dimethyl acrylic acid ethyl ester were heated under reflux in an oil bath kept at 120° C. and 25 grams of $SeO_2$ dissolved in 25 cc. of ethanol added dropwise over a period of 2 to 2¼ hours. Heating and stirring was continued for one more hour. The solution was cooled and filtered from the precipitated selenium. The filtrate was diluted with 1½ times its volume of water. The final product obtained by distillation in vacuo is γ-hydroxy-β-methyl crotonic acid ethyl ester of the same properties as the end product of Example II.

Both from the acetoxy ester and from the free hydroxy ester, there was obtained by hydrolysis with aqueous alkali γ-hydroxy-β-methyl crotonic acid of melting point 108–109.5° C., having the formula

The method above disclosed permits the preparation of many γ hydroxy unsaturated aliphatic acid derivatives having importance in organic synthesis as well as for other purposes. Among these compounds may be mentioned γ-hydroxy-β-methyl crotonic acid and its alkyl esters, the existence of which was hitherto unknown. These compounds may be easily converted into the corresponding γ-bromo-β-methyl crotonic acid or its alkyl ester, as the case may be, by the action of PBr₃ as will be illustrated in the following example of a procedure that we have employed in producing γ-bromo-methyl crotonic acid ethyl ester.

Following a procedure similar to that described in Example III, we have reacted dimethyl acrylic acid ethyl ester with selenous acid added in small increments in the dry powder form. In this case the proportion of acid used was 30 grams to 50 grams of the dimethyl acrylic acid ethyl ester; otherwise the procedure was the same as in Example III and likewise the product obtained was the γ-hydroxy-β-methyl crotonic acid ethyl ester.

Where herein we have referred to the esters or similar derivatives of the α,β unsaturated aliphatic acids as being responsive to the indicated reactions, it will be understood that the term "similar derivatives" is intended to include the corresponding anhydrides, acyl halogenides and nitriles, and that where in the claims the method is described as applied to the acids and their esters, the term "esters" is intended to include these similar derivatives.

Where in the claims reference is made to "selenous acid" as the reagent, it is to be understood that this term also includes selenium dioxide which is the functional equivalent for the purpose indicated.

Where in the claims reference is made to "the crotonic acids" it is to be understood that this term also includes the various substituted crotonic acids.

I claim:

1. The process for preparing γ-hydroxy derivatives of normal and branched-chain α-β unsaturated aliphatic acid alkyl esters, which derivatives are characterized by the presence of an hydroxyl group in a methyl group attached to the β-carbon atom, which comprises reacting a member of the group consisting of the normal and branched-chain α-β unsaturated aliphatic acid alkyl esters having a methyl group attached to the β-carbon atom, with selenous acid.

2. The process for preparing γ-hydroxy derivatives of normal and branched-chain α-β unsaturated aliphatic acid alkyl esters, which derivatives are characterized by the presence of an hydroxyl group in a methyl group attached to the β-carbon atom, which comprises reacting a member of the group consisting of the normal and branched-chain α-β unsaturated aliphatic acid alkyl esters having a methyl group attached to the β-carbon atom, with selenous acid in the presence of a solvent.

3. The process for preparing γ-hydroxy derivatives of the methyl crotonic acid alkyl esters, which comprises reacting a methyl crotonic acid alkyl ester with selenous acid.

4. The process for preparing γ-hydroxy derivatives of the methyl crotonic acid alkyl esters, which compries reacting a methyl crotonic acid alkyl ester with selenous acid in the presence of a solvent.

5. The process for preparing γ-hydroxy-β-methyl crotonic acid ethyl ester which comprises reacting β,β dimethyl acrylic acid ethyl ester with selenous acid.

6. γ-hydroxy-β-methyl crotonic acid.

7. An alkyl ester of γ-hydroxy-β-methyl crotonic acid.

8. γ-hydroxy-β-methyl crotonic acid ethyl ester.

9. γ-acetoxy-β-methyl crotonic acid ethyl ester.

10. A new compound of the general formula

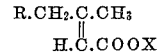

wherein R represents a radical selected from the group consisting of the acetoxy and hydroxyl groups, and wherein X represents a radical selected from the group consisting of hydrogen and an alkyl group.

HARRY H. SOBOTKA.
MARTIN I. RUBIN.

Patent No. 2,390,335. CERTIFICATE OF CORRECTION.

December 4, 1945.

HARRY H. SOBOTKA, ET AL.

It is hereby certified that error appears in the printed specification of the above numbered patent requiring correction as follows: Page 1, second column, line 39, for "$2\frac{1}{4}$ hours" read --$2\frac{1}{2}$ hours--; and that the said Letters Patent should be read with this correction therein that the same may conform to the record of the case in the Patent Office.

Signed and sealed this 5th day of February, A. D. 1946.

(Seal)

Leslie Frazer

First Assistant Commissioner of Patents.